United States Patent
Hughes et al.

(10) Patent No.: US 6,300,588 B1
(45) Date of Patent: Oct. 9, 2001

(54) MANUFACTURE OF REPAIR MATERIAL AND ARTICLES REPAIRED WITH THE MATERIAL

(75) Inventors: John Raymond Hughes, Scotia; Melvin Robert Jackson, Niskayuna; Charles Gitahi Mukira, Clifton Park; Allan Richard Susi, Delanson; Raymond Alan White, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/394,844

(22) Filed: Sep. 13, 1999

(51) Int. Cl.$^7$ ...................................................... B23H 5/00
(52) U.S. Cl. .................................... 219/69.17; 219/69.11; 219/76.1; 219/76.13
(58) Field of Search ............................. 219/69.17, 69.11, 219/76.1, 76.13, 137 R, 137 WM

(56) References Cited

U.S. PATENT DOCUMENTS

| | | | |
|---|---|---|---|
| 4,129,462 | * 12/1978 | Korenko | 148/31 |
| 4,213,026 | * 7/1980 | Duvall et al. | 219/75 |
| 5,106,010 | * 4/1992 | Stueber et al. | 228/232 |

* cited by examiner

*Primary Examiner*—M. Alexandra Elve
(74) *Attorney, Agent, or Firm*—Paul J. DiConza; Donald S. Ingraham

(57) ABSTRACT

A process for the manufacture of repair material. The repair material is ductile and readily mechanically deformed and can be used in the repair of turbine components. The process comprises providing a directionally solidified material, cold-swaging the directionally solidified material, and heat treating the cold-swaged material into the repair material. The repair material, after the steps of cold-swaging and heat treatment, comprises a microstructure that is essentially free from cracks, for repairing the turbine component. The invention also sets forth methods for repair of articles, such as turbine components, using the repair material, and a turbine component repaired using the repair material.

15 Claims, No Drawings

MANUFACTURE OF REPAIR MATERIAL AND ARTICLES REPAIRED WITH THE MATERIAL

BACKGROUND OF THE INVENTION

The invention relates to the manufacture of repair material. In particular, the invention relates to the manufacture of repair material from alloys that are difficult to mechanically deform.

Turbine components, such as blades, nozzles, vanes, airfoils, tips and the like (hereinafter "turbine components") are frequently formed from superalloys, for example, nickel-based superalloys, that have a directionally solidified single-crystal structure. The turbine components can be manufactured with defects, including cracks, surface defects, imperfections and holes. These defects must be repaired by various repair processes for reliable, proper, and dependable performance of the turbines. Turbine components also develop defects during service throughout their lifetime. These service and use related defects may occur by wear, oxidation, and erosion. Such defects include cracks, surface defects, imperfections, and holes. These turbine component defects must be repaired for proper, dependable, and reliable operation of the turbine.

A previous defect repair method provided a repair material that is comparable in chemistry to the turbine component's parent superalloy. Also, the repair material in the previous defect repair method may have been provided with an oxidation resistance that is comparable, or even superior, to the turbine component's parent superalloy. The repair material was melted, and re-solidified to the turbine component at the defect site. The process was intended to provide an integral repaired structure, with a turbine defect site proximate the defect melting and re-solidifying with the repair material. Thus, repair material and the turbine component material formed a solid, one-piece repaired member.

For repair of a turbine component by a welding repair process, such as tungsten inert gas (TIG) welding, the repair material is often provided in the form of a repair material wire. A weld wire has been previously manufactured by powder metallurgy processes in conjunction with mechanically working to a wire form. Powder metallurgy processes often produce high volume fractions of strengthening precipitates, such as the intermetallic phase commonly referred to as gamma prime. The gamma prime precipitate material ($\gamma'$) in amounts up to about 70% by volume makes weld wire less ductile and hard to deform with low workability, and difficult to form into small diameter wires, and difficult to handle. The $\gamma'$-containing material is difficult to mechanically deform at the temperatures commonly used for forming the weld wire, for example by a wire drawing process, is not ductile, and will not exhibit substantial plastic deformation to the point where the material will not easily bend. This type of low-ductility repair material is not well suited for further thermo-mechanical processing.

Complex multiple canning and hot extrusion processes have been attempted for producing weld wire, however the combination of these processes is an extremely expensive manufacturing process. For example, weld wire produced by the combination of multiple canning and hot extrusion processes may be up to ten times more in value than the raw metal itself.

Therefore, a repair material for turbine components that is relatively inexpensively produced, ductile, easy to therm-mechanically process, and readily capable of being mechanically deformed is needed.

SUMMARY OF THE INVENTION

The invention sets forth a process for the manufacture of repair material. The repair material is ductile and readily mechanically deformed, and can be used in the repair of turbine components. The process comprises providing a directionally solidified material, cold-swaging the directionally solidified material, and heat treating the cold-swaged material into the repair material. The repair material, after the step of cold-swaging with intermediate heat treatment, comprises a microstructure that is essentially free from cracks, for repairing the turbine component.

The invention also sets forth methods for repair of articles, such as turbine components, using a repair material. The repair material is ductile and readily mechanically deformed, and can be used in the repair of turbine components. The process comprises providing a directionally solidified material, cold-swaging the directionally solidified material, and heat treating the cold-swaged material into the repair material. The repair material, after the step of cold-swaging, comprises a microstructure that is essentially free from cracks, for repairing the turbine component.

Further, the invention sets forth a turbine component repaired using a repair material. The repair material for the turbine component is ductile and readily mechanically deformed, and can be used in the repair of turbine components. The repair material is formed by a process that comprises providing a directionally solidified material, cold-swaging the directionally solidified material, and heat treating the cold-swaged material into the repair material. The repair material, after the step of cold-swaging, comprises a microstructure that is essentially free from cracks, for repairing the turbine component.

DESCRIPTION OF THE INVENTION

The repair material, as embodied by the invention, comprises a $\gamma'$-strengthened superalloy-based material that is readily mechanically deformed, and can be formed into a desired configuration for article repair, for example turbine component repair. For example, and in no way limiting of the invention, the repair material configurations include weld wires, stranded wires, and blocks of repair materials, and other such configurations. The invention will be discussed with reference to a weld wire, however this is merely exemplary. Other configurations of repair material are within the scope of the invention.

The superalloy-based repair material is provided with an oxidation resistance that is comparable, or even superior, to the turbine component's parent superalloy. The ductile and readily mechanically deformed properties of the repair material are provided by control of input material microstructure prior to its deformation into the repair material. The term "input material" means raw or other such unprocessed material that is not typically used as repair material in its "as-is" form. For an input material to be used as repair material at least one processing step is typically conducted on the input material. Therefore, the repair material is provided with physical properties that approximate those of the turbine component parent superalloy.

The repair material, as embodied by the invention, is formed from a $\gamma'$strengthened directionally-solidified (DS) superalloy starter material (hereinafter "starter material"). The starter material can be provided in the form of a billet. The billet comprises a microstructure that is essentially free of any substantial, detrimental micro-shrinkage, which adversely impacts processing of the starter material. The term "essentially free" means that any amounts of the constituent are not sufficient to alter the desired properties of the repair material. The starter material can be formed by any appropriate metallurgical process, such as a directional solidification process that results in the desired directionally solidified microstructure. The directional solidification process can comprise a casting process in which heat flows in one direction, so that intercolumnar grains can be formed.

Once the starter material is provided, the starter material is then processed into a desired repair material configuration. If the repair material configuration comprises a weld wire, wires are formed from the billet by an appropriate process, such as an electrical discharge machining (EDM) process. Thus, an EDM DS wire (hereinafter "DS wire") is formed. The DS wire comprises a relatively large diameter, such as with a generally square cross-section having sides of about 0.1 inch (0.25 centimeters) in length. Alternatively, the DS wire can be circular in cross-section, for example having a diameter up to about 0.4 inches. In this disclosure the term "about" is used to mean approximate or nearly, as is reasonably understood in the art. The diameter of the starter wire diameter need not be closely controlled because of the subsequent swaging deformation (as described hereinafter) provides a final weld wire, when produced, with a final desired diameter.

The DS wire can be originally formed with a generally square cross-section. A square cross-section of the DS wire for forming a weld wire for turbine component repair may be formed with a generally square cross-section having sides of about 0.1 inch, for example about 0.06 inches (0.15 centimeters) in length. The DS wire is then ground, for example but not limited to, ground by a centerless grinding operation, to reduce the DS wire's size. This step of the manufacturing process reduces the DS wire to a generally cylindrical wire with cross-sectional diameter of about 0.06 inches (0.15 centimeters) in length.

Alternatively, the DS wire can be originally formed with a generally round cross-section. A round cross-section of the DS wire for forming a weld wire for turbine component repair may be formed with a diameter of up to about 0.4 inches (about 1 centimeter). The DS wire can then be ground, for example but not limited to, ground by a centerless grinding operation, to reduce the DS wire's size. This step of the manufacturing process reduces the DS wire to a generally cylindrical wire with cross-sectional diameter of about 0.01 inches smaller than the original DS wire.

After the DS wire is ground, the DS wire is subjected to at least one cold swaged step to form a swaged weld wire. The cold-swaging step is typically conducted at temperatures below the recrystallization temperature of the starter material. Further, the cold-swaging step is conducted at temperatures below the gamma prime ($\gamma'$) solvus temperature to avoid the dissolution of $\gamma$ material. The at least one cold swaging step forms a wire with a cross-sectional diameter of about 0.04 inches (0.125 centimeters). The wire with a cross-sectional diameter of about 0.04 inches can then be ground to a diameter of about 0.035 inches, for certain applications.

The swaged DS weld wire is essentially free of longitudinal cracking and end-cracking after the cold swaging step. The cold-swaging step can be repeated, as needed, to achieve a desired final weld wire diameter. For example, for turbine component repair applications, the cold-swaged final weld wire can comprise diameter of about 0.03 inches (0.075 centimeters) in length. This final weld wire diameter represents about a 75% reduction in area from the initial DS wire formed from the billet.

The DS wire may be subjected to a heat treatment after each coldswaging step. The heat treatment comprises a low temperature heat treatment, in which the temperature is in a range from about 1600° F. to about 1750° F., for a length of about one-hour. The heat treatment permits continued deformation of the DS wire after reduction in area in an area reduction range from about 30% to about 50%. The heat treatment also permits renewed deformability, however does not cause recrystallization of the material.

The starter material, for example a starter material in the form of a billet, comprises at least one or several crystals having a granular microstructure that contains few, if any, grain defects and micro-shrinkage. Generally the starter material comprises up to three grains across the cross-section of the DS wire. This granular microstructure permits the final weld wire to be mechanically deformed without the resulting problems typical of conventionally cast or consolidated-powder superalloy materials, such as difficulty in both bending and thermo-mechanical processing, and brittleness, contamination, and uneven deformation during metallurgical formation processes, such as, but not limited to, swaging.

Weld wires formed by a wire manufacture process, as embodied by the invention, provide desirable weld granular microstructures for a turbine component repair process. The weld granular microstructures are generally free from at least one of cracking and contamination. Therefore, when used as a repair material, the resultant repaired area on the turbine component will provide a stable, sound turbine component.

Examples of turbine component repair processes using the repair material, as embodied by the invention, will now be discussed. These examples are not intended to limit the invention in any way. In repairing a turbine component crack defect, a weld wire, which is formed according to a process as embodied by the invention, can be disposed in the defect. The weld wire is disposed in the defect by deforming the weld wire to conform with the defect. The weld wire repair material and a surrounding turbine component site (defect site) are treated by being melted by an appropriate source of energy, such as an electron beam. The melted repair material and turbine component defect site re-solidify together. The re-solidified repaired turbine component site possesses a microstructure, for example a directionally solidified single-crystal microstructure, that is the same as a remainder of the turbine component. Thus, the repaired site is integral with similar microstructure metallurgically sound and unlikely to fail at the repaired site.

The weld wire repair material may also be used to repair a turbine blade tip. To repair a turbine blade tip, the weld wire repair material is provided in a weld wire source and the end of the weld wire is positioned at the turbine blade tip. An end of the weld wire is simultaneously melted with a small region of the turbine blade tip. The weld wire source is then moved around the perimeter of the turbine blade tip, while feeding weld wire material to the melted region (often referred to as a pool) of the turbine blade. The melted materials are then re-solidified with the turbine blade tip.

Further, as another non-limiting example of application of a weld wire repair material, as embodied by the invention, the weld wire can be used in a tungsten inert gas (TIG) welding process. The TIG welding process can be used to repair a turbine component. The TIG welding process is often used to replace ground-away portions of a turbine component. The weld wire is melted and disposed on the turbine essentially in the same step.

The weld wire manufacture process that comprises combination of directional solidification and cold swaging steps, as embodied by the invention, represents an economical alternative to previous complex wire-making processes. The weld wire manufacture process that comprises combination of directional solidification and cold swaging steps, as embodied by the invention, can be used on various forms of wires including, but not limited to, single-strand and multi-strand directionally solidified wires.

While various embodiments are described herein, it will be appreciated from the specification that various combinations of elements, variations or improvements therein may be made by those skilled in the art, and are within the scope of the invention.

What is claimed is:

1. A process for the manufacture of repair material, the repair material being ductile and readily mechanically deformed, the process comprising:

providing a γ'-strengthened directionally solidified superalloy material;

cold-swaging the γ'-strengthened directionally solidified superalloy material; and heat treating the cold-swaged material into a repair material, wherein the repair material after the step of cold-swaging comprises a microstructure that is essentially free from cracks.

2. A process according to claim 1, wherein the step of providing the repair material comprises:

providing a γ'-strengthened directionally solidified superalloy billet: and forming wires from the billet.

3. A process according to claim 2, wherein the step of forming wires comprises forming wires by an electrical discharge machining (EDM) process.

4. A process according to claim 1, wherein the step of cold-swaging forms a weld wire.

5. A process according to claim 4, further comprising forming the weld wire into a stranded weld wire.

6. A process according to claim 4, wherein the step of cold-swaging comprises one cold-swaging step.

7. A process according to claim 4, wherein the step of cold-swaging comprises a plurality of cold-swaging steps, each cold-swaging step separated from each other by the heat treating step.

8. A process according to claim 1, wherein the step of providing a γ'-strengthened directionally-solidified superalloy material comprises forming wires from a γ'-strengthened directionally-solidified superalloy billet, the wires being formed by electrical discharge machining.

9. A process according to claim 8, wherein the step of forming wires by electrical discharge machining comprises forming wires with a generally square cross-section.

10. A process according to claim 9, wherein the step of forming wires with a generally square cross-section comprises forming wires having a generally square cross-section having sides about 0.1 inches in length.

11. A process according to claim 8, wherein the step of forming wires by electrical discharge machining comprises forming wires with a generally round cross-section.

12. A process according to claim 11, wherein the step of forming wires with a generally round cross-section comprises forming wires having a round cross-section with a diameter of about 0.4 inches.

13. A process according to claim 1, wherein the step of providing a γ'-strengthened directionally solidified superalloy material comprises providing γ'-strengthened directionally solidified superalloy material comprising a single crystal.

14. A process according to claim 1, wherein the step of cold-swaging the γ'-strengthened directionally solidified superalloy material into a repair material comprises forming a rounded cylindrical wire.

15. A process according to claim 12, wherein the step of forming a rounded cylindrical wire comprises a plurality of cold-swaging steps, each cold-swaging step separated from each other by the heat treating step.

* * * * *